United States Patent [19]

Lucas

[11] Patent Number: 4,723,714

[45] Date of Patent: Feb. 9, 1988

[54] PROGRAMMABLE SPRINKLER SYSTEM

[76] Inventor: Gary H. Lucas, P.O. Box 1406, Hightstown, N.J. 08520

[21] Appl. No.: 911,376

[22] Filed: Sep. 25, 1986

[51] Int. Cl.$^4$ ............................................. A01G 25/09
[52] U.S. Cl. ..................................... 239/744; 104/91; 239/749; 239/751; 239/195
[58] Field of Search ............................... 239/195–197, 239/208–210, 743–745, 749, 750–753; 104/89, 91, 124; 105/148

[56] References Cited

U.S. PATENT DOCUMENTS

| | | | |
|---|---|---|---|
| 3,881,568 | 5/1975 | Ando et al. ........................ | 180/168 |
| 3,948,342 | 4/1976 | Pircher et al. ...................... | 180/168 |
| 4,003,445 | 1/1977 | De Bruire .......................... | 180/168 |
| 4,074,856 | 2/1978 | Williams et al. ................... | 239/197 X |
| 4,099,669 | 7/1978 | Cortopass ......................... | 239/733 X |
| 4,108,269 | 8/1978 | Nakao ................................ | 180/168 |
| 4,172,551 | 10/1979 | Johnson ............................ | 239/733 |
| 4,291,837 | 9/1981 | Gheen .............................. | 239/737 X |
| 4,463,906 | 8/1984 | Reinke et al. ..................... | 239/739 |

Primary Examiner—Andres Kashnikow
Assistant Examiner—Mary Beth O. Jones
Attorney, Agent, or Firm—Sachs & Sachs

[57] ABSTRACT

A programmable sprinkler system ideally suited for use in an enclosure such as a nursery and/or arboretum includes a first overhead rail and a water pipe connected to a pressurized source of water. The water pipe is provided with a plurality of water valves placed at discreet intervals along its length and extend outwardly therefrom and is positioned alongside and close to the first overhead rail and parallel thereto. A source of electrical power is positioned close to and generally parallel with the first rail on the other side thereof and extends essentially its entire length. A plurality of second overhead rails have one end of each positioned near the valves and the first rail and extends outwardly therefrom, preferably at right angles thereto, defining a path along which the water is to be dispensed. A carrier mechanism rests on the first rail. Nested upon the carrier mechanism is a detachable car that includes a second coupling device to bring electrical power to it. The car also includes a plurality of water dispensing heads, a mating coupling for the valves on the water pipe, and a hose for carrying the water from the valve along the full length of the second rail in order to dispense water along the path provided by the second rail. Reflective devices together with a light source provide an electrical signal which controls the amount of water to be dispensed and the speed that the car and carrier are to move along the first and second rails, respectively. These signals are coupled to the programmable computer which is located in the detachable car.

17 Claims, 18 Drawing Figures

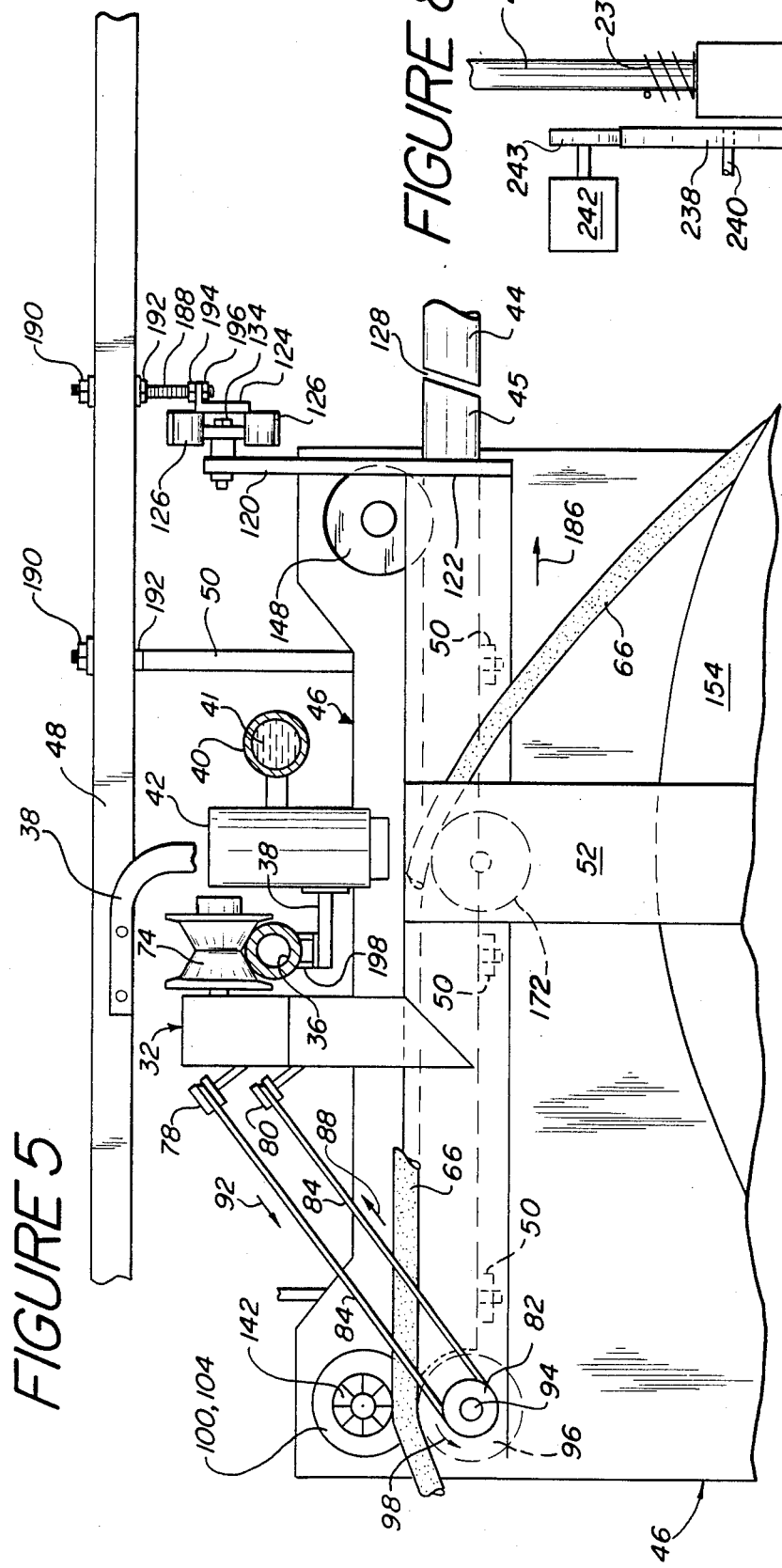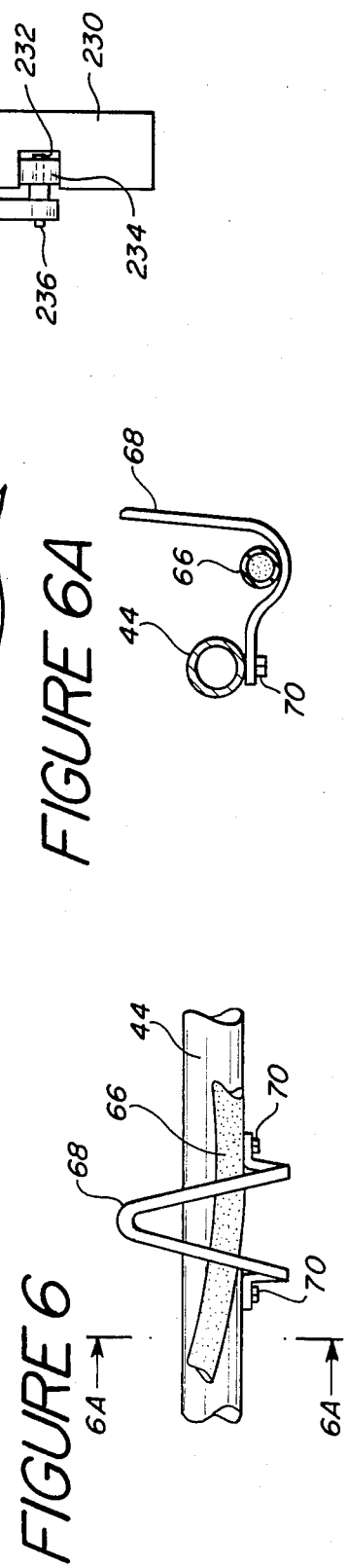

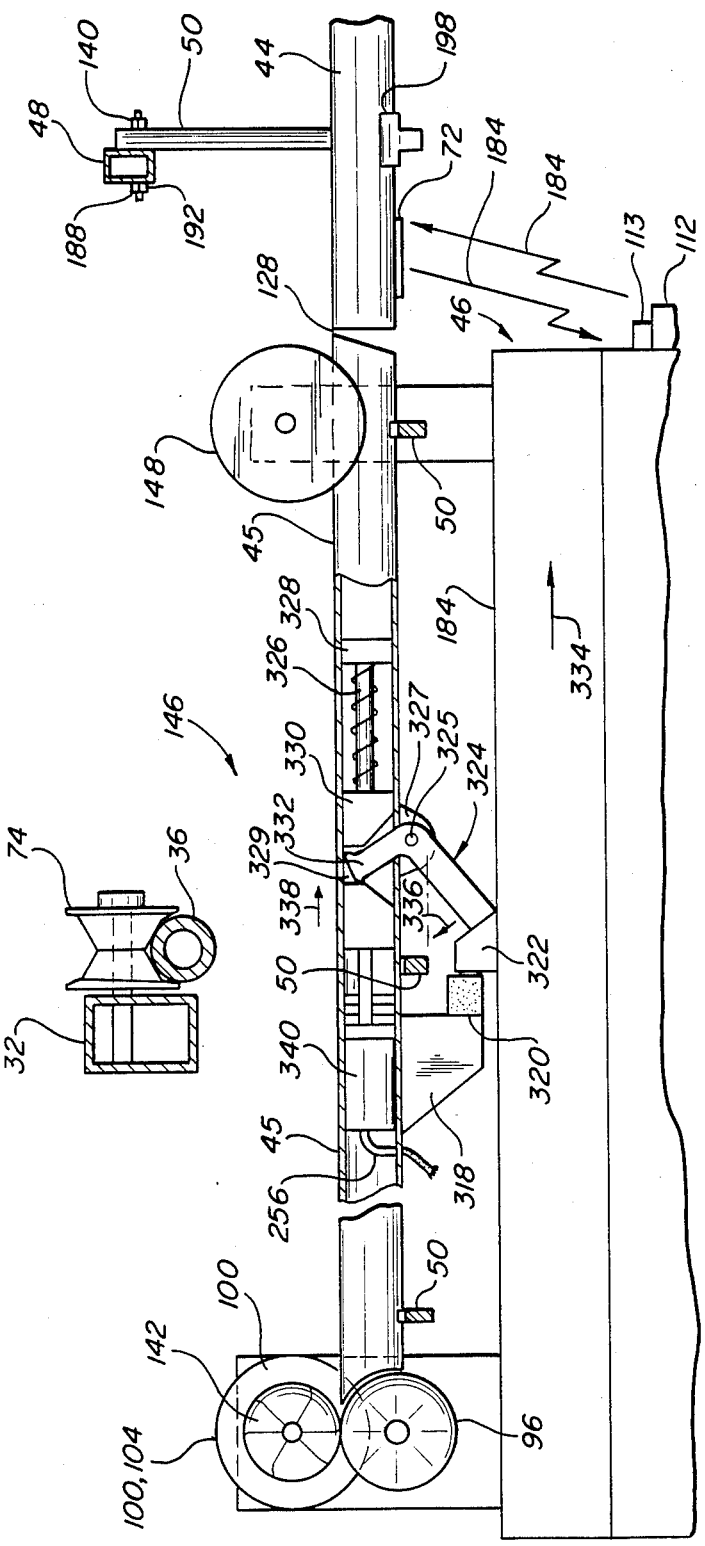

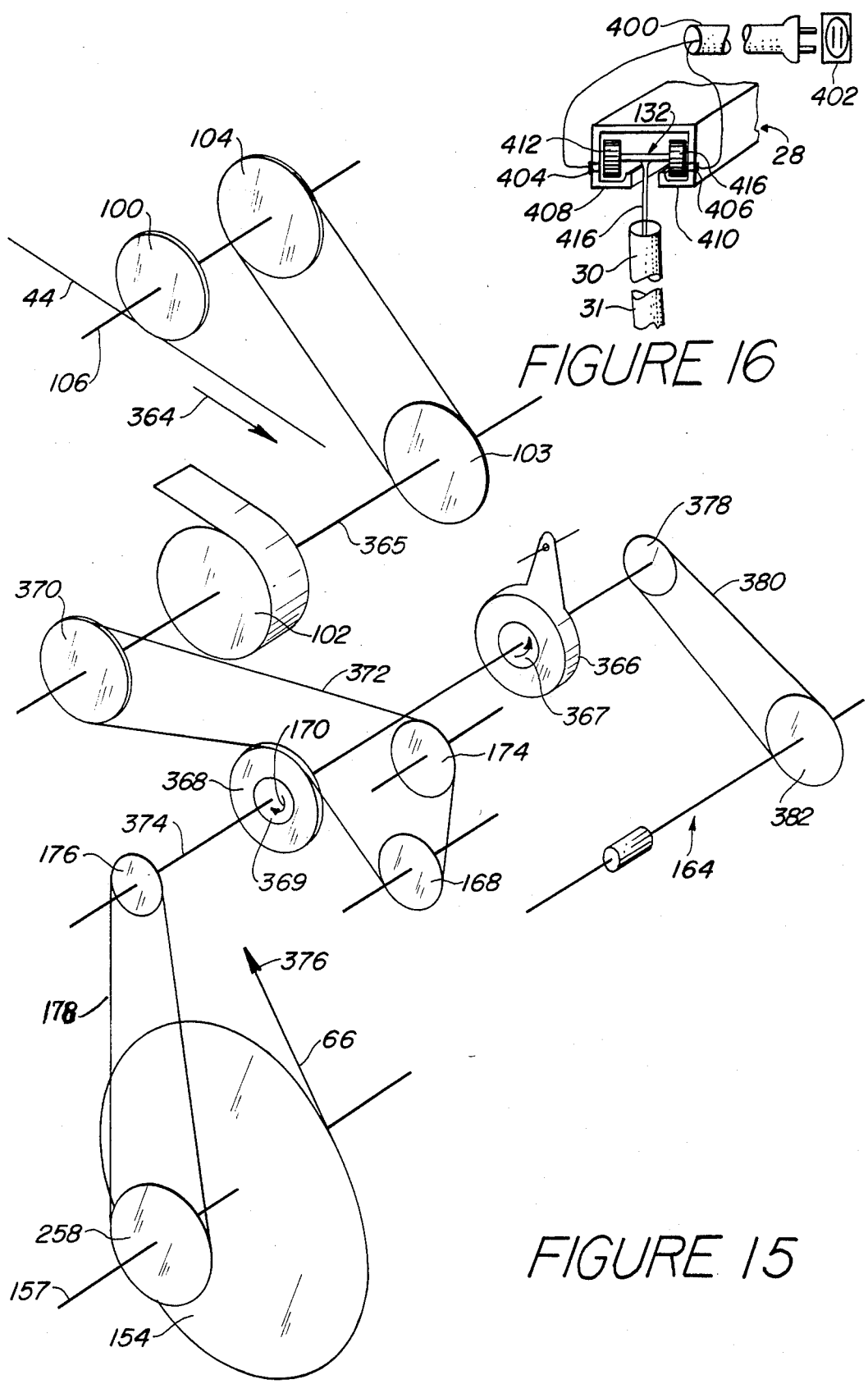

PROGRAMMABLE SPRINKLER SYSTEM

BACKGROUND OF THE INVENTION

1. Field of the Invention

The present invention relates to automatic watering systems, and in particular, to an automatic, programmable sprinkler system capable of watering large areas with the aid of a detachable car responsive to a preset program which may be modified or updated each time the detachable car leaves its carrier mechanism and moves along a plurality of rail paths.

2. Discussion of the Relevant Art

The art abounds with various types of automatic irrigation systems which generally fall into two broad classes. The first class is of a type which includes a water feed pipeline having a number of valves or connections to which one end of a hose may be affixed. The other end of the hose is connected to the watering mechanism. The watering mechanism may be automatically controlled either continuously operating or intermittent operation moving along under a programmable, preset number of cycles. As the watering mechanism moves along, it drags the hose behind it until the hose becomes fully extended at which time the system will shut down requiring a human to disconnect the hose and move it to the next valve opening along the line, wherein the cycle is repeated indefinitely. This type of system is generally used outdoors and may cover large areas. Typical of this type of watering mechanism is U.S. Pat. No. 4,463,906 issued Aug. 7, 1984 to Reinke, et al and U.S. Pat. No. 4,291,837 issued on Sept. 29, 1981 to Gheen.

In an alternative approach, watering mechanisms have been designed to travel along an irrigation ditch having water disposed therein. A pumping device inserted in the water filled irrigation ditch brings the water to the watering mechanism. Thus, as the automatic watering mechanism moves along the prescribed path generally perpendicular to the irrigation ditch the water may be transferred to the watering mechanism in a continuous manner controlled by the watering mechanism. There is no need to disconnect and connect a hose that is dragged along behind the watering mechanism as required in the first instance. This simplifies the automatic operation and relies on the programmed automatic control to continuously pump the water from the ditch to the mechanism as the watering mechanism moves along. Typical of in irrigation system which uses a reservoir disposed along the path to be watered with a pumping device to take the water out of the irrigation reservoir (or ditch) is U.S. Pat. No. 4,172,551 issued to Johnson on Oct. 30, 1979 and U.S. Pat. No. 4,099,669 issued to Cortobassi on July 11, 1978.

Automatic robots are well known in the art and these mechanisms generally move along prescribed paths having some sort of guide path established by track members positioned below ground. The proximity of the moving vehicle to the ground guide path may be determined by a system which operates on magnetic lines of flux as a receiving and transmitting system as disclosed in U.S. Pat. No. 4,108,269 issued to Naro on Aug. 22, 1978, or alternatively a system wherein code signals are transmitted along the channel path to guide the moving vehicle and/or the function that is to be performed. Typical of an automatic control vehicle following a prescribed path is U.S. Pat. No. 4,003,445 issued to DeBruine, on Jan. 18, 1977. A passive code marking system disposed along the path is disclosed in U.S. Pat. No. 3,948,342 issued to Parcher, et al on Apr. 6, 1976. Another automatic vehicle control system that travels along a predetermined path is disclosed in U.S. Pat. No. 3,881,568 which issued to Ando, et al on May 6, 1975. This patent utilizes a light detector which receives the reflected light from a guide band arranged on a predetermined surface path. However, these automatic robot devices do not disclose or suggest any manner of providing irrigation (water) over a prescribed area.

Another automatic system specifically relating to irrigation of a prescribed area is the apparatus manufactured by Growing Systems, Incorporated of Milwaukee, Wis. The apparatus disclosed therein provides for a moving watering mechanism suspended from a pair of overhead rails. The mechanism includes a drive motor and a programmable control device which permits the vehicle to move along the pair of rails and water the area along the path described by the rails. The apparatus is limited insofar is it drags the hose connected to a pressurized water reservoir along behind the vehicle and may only be used in a prescribed single path extending the length of the hose. As the hose moves behind on hangers, it is kept off the ground and is suspended from the same pair of rails upon which the moving vehicle travels. This apparatus operates in both the forward and reverse directions and has limited use since a separate independent vehicle and system must be installed for each area to be irrigated. Thus, if large areas are to be covered with the spraying system, a plurality of watering systems would have to be installed since they may only move the length of the hose which is typically between 50 and 100 feet.

The instant invention overcomes the shortcomings of the prior art by providing an overhead watering system ideally suitable for use in large hothouses and/or nurseries wherein the limited footage of hose (150 feet) is carried with the watering mechanism. A single carrier may water any number of watering paths determined by an overhead rail system wherein the watering or irrigating car is detached from the carrier mechanism and can water a plurality of water paths completely controlled by preset instructions in the computer or programming means associated therewith. The irrigating car may have its instructions varied for each of the water paths and also may have instructions changed periodically along each prescribed path, thus providing an incrementally different watering scheme along each of the water paths.

Therefore, it is an object of the present invention to provide a reliable inexpensive irrigational watering system capable of watering a plurality of irrigation paths while only using a single system.

It is another object of the present invention to provide an overhead irrigation system which may be preset and programmed by the operator thereof.

It is still yet another object of the present invention to provide an overhead watering system which may irrigate a plurality of water paths with a single watering apparatus and has the ability to modify the irrigation along each of the paths or portions thereof.

It is further another object of the present invention to provide an overhead watering and/or irrigation system that does not require a human to interfere with the watering program by making incremental connections to the pressurized water reservoir.

It is still yet another object of the present invention to rovide an automatic irrigation system which utilizes a carrier apparatus and a detachable car device which may move along a second controlled path to provide watering over the complete length of the hose which is suspended along to the overhead control path railing.

It is still yet a further object of the present invention to provide an automatic irrigation system which includes programmable computer device associated therewith which may be preprogrammed or obtain alternative programming instructions by optical means disposed along the watering path.

It is still yet a further object of the present invention to provide an irrigation system which utilizes a single carrier rail to define a watering path and upon which the watering device travels and returns with the ability of supply water in both directions.

It is still yet an additional object of the present invention to provide an automatic irrigation device capable of sensing obstructions in the watering path, provide a signal to a control perator that an obstruction has incurred, so that it may be removed, and then the watering device continues along its path.

SUMMARY OF THE INVENTION

A programmable sprinkler/irrigation system, according to the principles of the present invention comprises in combination, a first overhead rail, a pressurized water pipe disposed proximate the first overhead rail, which has a plurality of water valves extending outwardly and disposed at discrete intervals along its length. A source of electrical power is positioned proximate to and generally parallel with the first rail and extends essentially the entire length thereof. A plurality of second overhead rails are provided with each one of the rails having one end disposed proximate the water pipe and each of the water valves. The other end of the second rail extends away from the first rail, preferably perpendicular thereto, and defines a path along which the irrigation water is to be dispensed. A carrier mechanism is placed on the first rail. The carrier mechanism includes a device for moving the carrier along the first rail and includes a coupling mechanism to couple to the source of electrical power. The carrier also includes a detachable car which includes a device for coupling to the source of electrical power, a moving mechanism to move the car along the second rail, dispensing water heads, a coupling mechanism or plunger and an auxiliary drive motor for engaging each of the water valves in turn, and also provides a continuous water flow path to the water dispensing heads. A programmable computer is disposed in the car and controls the amount of water to be dispensed along each of the defined water paths.

The foregoing and other objects and advantages will appear from the description to follow. In the description, reference is made to the accompanying drawing which forms a part hereof, and which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which:

FIG. 5 is a partial view taken along the line 5—5 of FIG. 2;

FIG. 6 is a side view, in elevation, of the hose disposed upon the path defining rail;

FIG. 6A is a cross-sectional view taken along the lines 6A—6A shown in FIG. 6;

FIG. 8 is a partial side view in elevation of the water coupling plunger shown is FIG. 7;

FIG. 10 is a side view in elevation, partially broken away, of the attachment/detachment mechanism utilized to release the irrigation car from the carrier mechanism;

FIG. 11 is a bottom plan view, partially broken away, of the attachment/detachment mechanism shown in FIG. 10;

FIG. 15 is a pictorial schematic representation of the driving system and hose control mechanisms of the preferred embodiment; and FIG. 16 is a pictorial representation of the mechanism used to provide electrical power for operation of the programmable sprinkler system shown in FIG. 1.

DESCRIPTION OF THE PREFERRED EMBODIMENT

Figure 1:
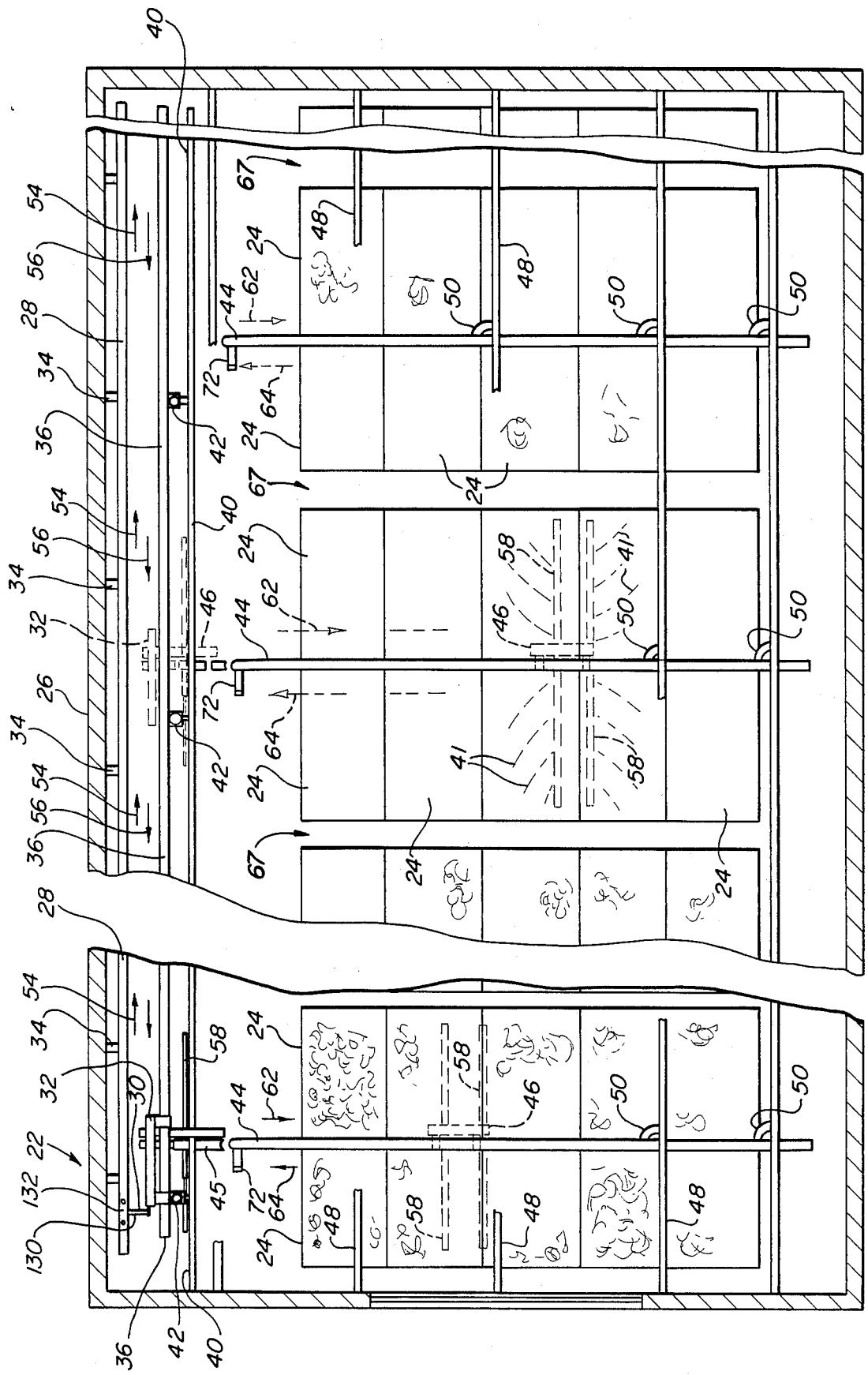
FIG. 1 is a top plan view illustrating the programmable sprinkler system, installed in a nursery building, according to the principles of the present invention.

Referring now to the Figures, and in particular to FIG. 1, there is shown a top or plan view layout of a programmable sprinkler system 20 according to the principles of the present invention. The sprinkler system 20 is installed in a building or enclosure 22 such as a nursery, hothouse or arboretum in which numerous plants and trees are grown prior to their being transferred to a permanent location in the outside environment. Typically the same type of flower, plant or tree would be placed on skids or boxes 24 with each skid or box containing a plurality of plants and preferably positioned so that similar types of plants or shrubs would be placed in a row so that when the shrubbery is to be watered they would each get sufficient water to promote optimum growth. Although the instant invention is not restricted to any one set of watering procedures, it simplifies matters if the shrubbery, flowers, trees, etc. of similar types are boxed together so that the amount of water supplied to each type may be optimized and when they are eventually separated for distribution it simplifies the sorting problem.

The nursery building 22 is shown with its roof removed and would be a typical hothouse wherein various types of plants, shrubs and/or trees are to be grown. Typically the roof of such a building would consist of a transparent or translucent cover to permit the sunlight to enter and reach the plants as they are growing. The building 22 is shown broken into several parts merely for convenience and to remove the repeating of the number of irrigation paths as will be explained hereinafter. Typically along one of the long walls 26 of the nursery or hothouse 22 is chosen for the starting or home position of the sprinkler system 20. A source of electric power, not shown, which may be a typical conventional AC outlet 400 (see FIG. 16) is wired via a cable 422 to the terminals 404 and 406 of the electrical power strip 28 which is generally U-shaped having an open portion with a pair of electrically conductive tracks 408 and 410 disposed therein which extends the entire length of the building wall 22. The pair of conductor tracks 408 ands 410 are connected to the wall terminals and internally there is disposed a trolley device or mechanism 132 which is capable of moving the entire length of the electrical power strip 28. The trolley 132 includes a pair of electrical conductive contacts wheels which are in contact with the pair of conductive tracks, 408 and 410, and is provided with a coupling device 416 extending outwardly of the opening of the U-shaped housing adapted to receive wires 30 emanating from feed through pressure terminal or connector 31 located on the carrier mechanism 32 which is described in detail hereinafter with the aid of FIGS. 2, 3, 4 and 5. A typical electrical power strip is manufactured by the I-T-E Busway Systems Lighting Duct Company of Rolling Meadows, Ill., known as Model No. D2210. The electrical power strip 28 is suspended from the ceiling in a conventional manner with the aid of brackets 34.

Figure 2:
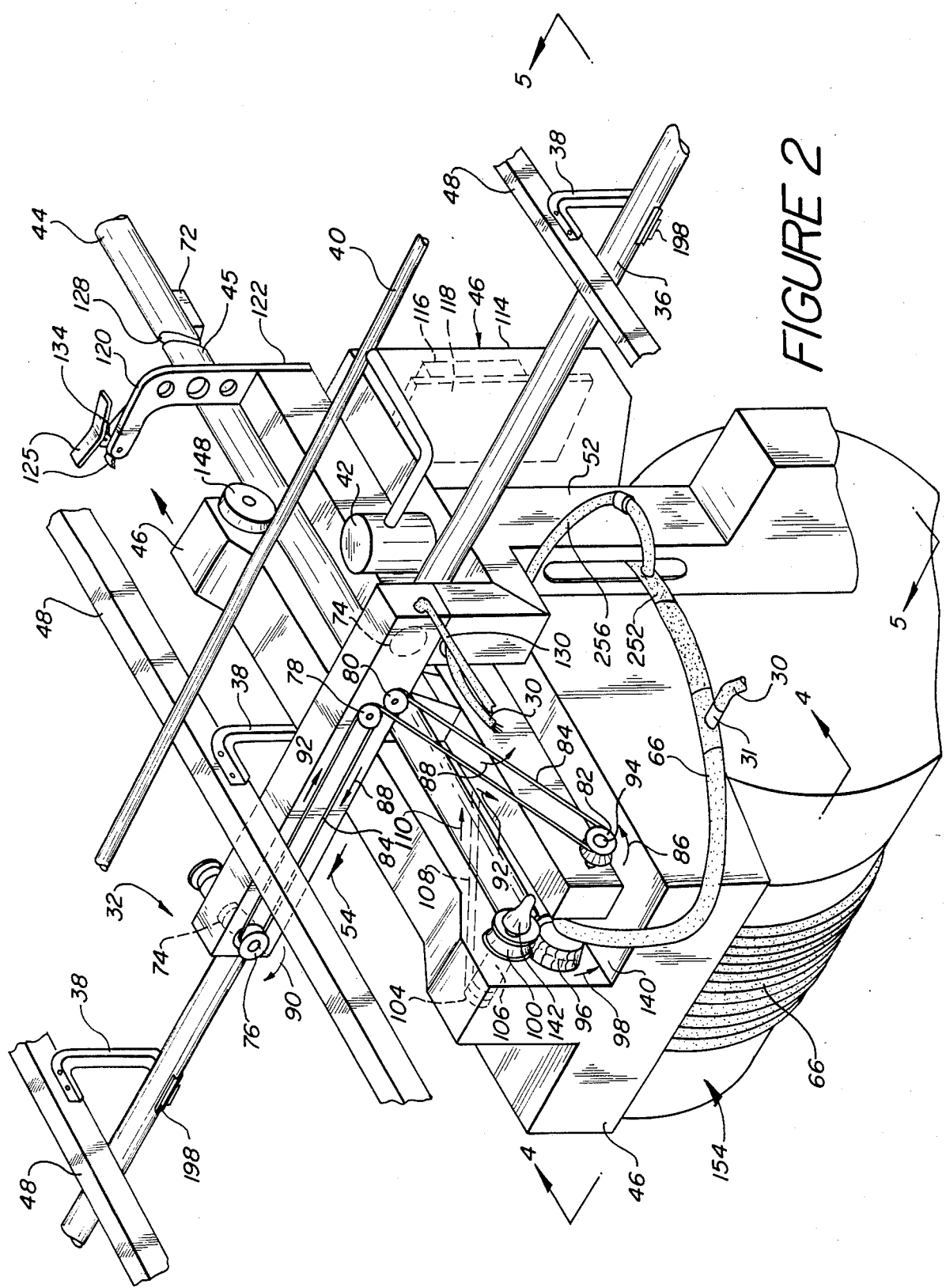
FIG. 2 is an enlarged isometric pictorial representation of the carrier and irrigation car with portions broken away for clarity.

Parallel to the electrical power strip 28 and extending essentially the full length of the building wall 22 is an overhead rail 36 which is suspended from the ceiling of building 22 with the aid of C-shaped hangers 38 (see FIGS. 2 and 5). A source of water 41 under pressure, not shown, is connected to a water pipe 40 that is provided with water valves 42 which extend outwardly from the water pipe 40 and are positioned at discrete positions along the length of the pipe. The pipe 40 extends parallel to the electrical power strip 28 approximately the full length of the building. The water valve 42 will be described hereinafter in great detail in conjunction with FIGS. 7 and 8. Water valve 42 is known as a ball valve and seals off any water therethrough until a mating plunger device 52 is inserted therein as will be explained.

A plurality of rails 44 upon which the irrigation car 46 may travel are suspended from cross beams 48 spaced at increments across the width of building 22 extending longitudinally along the length of the building. Cross-beams 48 are provided with C-shaped hangers or brackets 50 that are spaced along the length of the irrigation car rails 44 in a manner to rigidly support the rails 44 in fixed position. Although as shown in FIG. 1, the irrigation car rails 44 are perpendicular to the overhead rail utilized to support the carrier mechanism 32 thereon they may, in fact, be disposed at an angle provided the water valves 42 are in the proper location to cooperate with the mating plunger 52 (see FIGS. 2, 7 and 8). Once the plunger 52 has made contact with the water valve 42, the rail may bend gradually as long as the irrigation car 46 is able to ride thereon.

The car rails 44 determine the path along which the irrigation water is to be dispensed and thus, the boxes or skids 24 are aligned on either side of rail 44 along the width of the building 22 and may be repeated any number of times since, as will be explained hereinafter, the irrigation car 46 is capable of leaving the carrier mechanism 32 upon which it is mounted while moving in the direction of arrows 54 at discrete intervals, the position or interval at which the irrigation car 46 leaves the carrier mechanism 32 is determined by the location of each of the plurality of car rails and an optical reflector mechanism 72 that is disposed on the carrier rail 36 proximate each irrigation rail 44. The location of each of the plurality of car rails 44 and an optical reflector mechanism 72 that is disposed on the carrier rail 36 proximate each irrigation car rail 44 and an additional reflector 72 disposed on the underside of car rail 44.

The mechanism for permitting the irrigation car 46 to leave the carrier mechanism 32 will be explained hereinafter in detail. Suffice it to say at the present time, that an optical system including a reflector 72, a light source 112, and receiver or photoelectric detector 113 is located on the irrigation car 46 and reads information on the reflectors 72 disposed on the rail 44. When the carrier mechanism 32 reaches the end of the overhead rail 36, it is provided with a reflected light signal 184 impinging on the optical reading detector 113 (FIG. 3) which causes the motor 102 mounted therein to reverse, thus, causing the carrier mechanism 32 to move in the direction of arrows 56, permitting it to return to its initial or start position. The irrigation car 46 is capable of leaving the carrier mechanism 32 and moving along the car rails 44 when the carrier mechanism is aligned with car rail 44. It is only a matter of insuring the proper alignment of the movable extension rail portion 45 with rail 44 by providing the proper alignment information which is obtained by placing a reflector 72 along the carrier rail 36 for the car 46 to be able to leave the carrier 32, explained hereinafter. Extension rail 45 is permanently affixed to the carrier mechanism 32.

Figure 3:
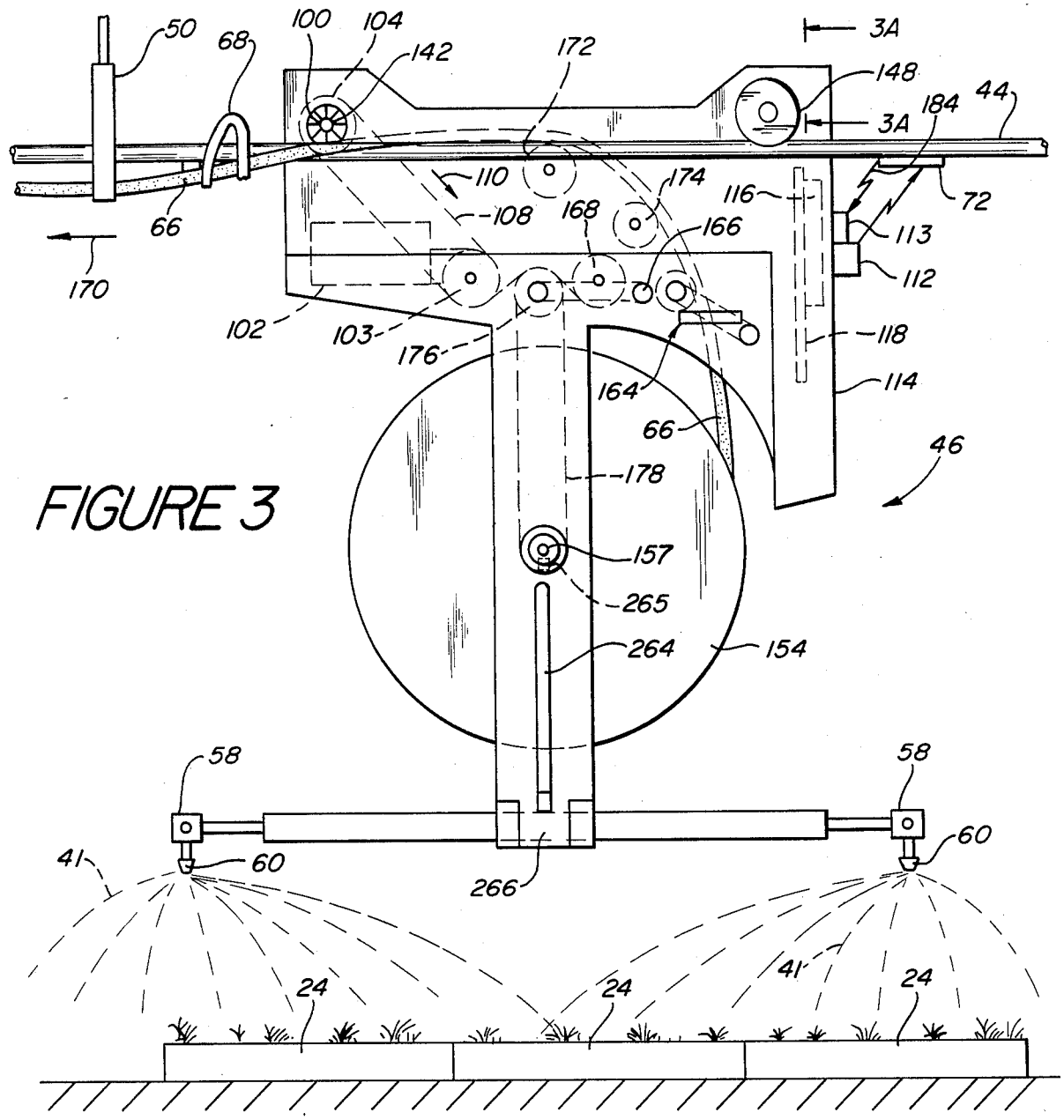
FIG. 3 is a side view in elevation of the removable irrigation car positioned upon a rail which determines the irrigation path.

Once the irrigation car 46 leaves the carrier mechanism 32 it moves along car rail 44 providing water for irrigation by a boom 58 which has a plurality of spray heads 60 disposed thereon along the length thereof (See FIG. 3). The forward and rear booms 58 may be activated at the same time or individually, thus providing another control over the amount of water to be dispersed along the irrigation path. Obviously the speed that the irrigation car 46 moves along rail 44 will also determine the amount of water being placed on each of the skids 24 disposed below the sprinkler heads 60. A further discussion with regard to the control system will show how other means are available to control the amount of water being dispensed and also the method used for varying the amount of water which can be dispensed in increments as the irrigation car moves along car rail 44. It is also to be noted that irrigation car 46 may move in the forward direction as shown by arrows 62 and in the reverse direction as shown by arrows 64 and that the amount of water being dispensed may be varied on the forward run as compared to the reverse run along rail 44, if desired.

The aisles 67 are provided between the rows of skids 24 so that persons working on the skids 24, either adding or taking out plants, will not be disturbed by the watering of the skids and the paths will remain dry. As shown in FIG. 1, only a sample number of rail paths 44 are depicted. It is to be noted that a desired number of rail paths may be provided with each being watered in a different manner.

When the irrigation car 46 leaves the carrier mechanism 32 a water hose 66 is laid out behind the carrier as shown in FIGS. 3, 6 and 6A. The hose 66 is held in position along the rail 44 by means of a hanger bracket 68 and C-shaped brackets 50 which are affixed to the rails 44 by a pair of conventional bolts 70 (see FIGS. 6 and 6A).

FIG. 2 is an enlarged isometric view, partially broken away, showing the carrier mechanism 32 with the irrigation car 46 disposed thereon at the point in which the irrigation car 46 has been stopped in position ready to permit the irrigation car 46 to leave the carrier mechanism and move off along the car rail 44 that defines the irrigation path. The carrier mechanism 32 rides upon carrier rail 36 by aid of a pair of support wheels 74 (see FIGS. 4 and 5). Support wheels 74 are driven by a plurality of pulley wheels 76, 78, 80 and 82 driven by a belt 84 which receives power from pulley wheel 82. Pulley wheel 76 is rigidly affixed to the same axle as support wheel 74 and thus, the power driving pulley wheel 82 when rotated in the direction of arrow 86 will cause the belt 84 to move in the direction of arrow 88 causing pulley wheel 76 and thus, support wheel 74 to rotate in the direction of arrow 90. Thus, the returning portion of belt 84 will move in the direction of arrows 92. Affixed to the same shaft or axle 94 is toroidal drive wheel 96, which is driven in the direction of arrow 98 by frictional contact with driving wheel 100. It is to be clearly noted that driving wheel 100 only comes in contact with toroidal drive wheel 96 when the irrigation car is in its extreme end or home position and thus, driving power for the carrier mechanism can only be obtained when the toroidal drive wheel 96 is in frictional contact with driving gear 100. Driving wheel 100 is driven by a belt and pulley system and is connected to the drive motor 102 which is located in the irrigation car 46 (see FIG. 3). The operation of the driving motor and the gear and pulley arrangements will be discussed in detail with regard to FIG. 3 and the complete pulley and drive system is disclosed in conjunction with FIG. 15

A driving pulley gear wheel 104 is disposed on the opposite end of shaft 106 and is rigidly affixed thereon. Driving pulley wheel 104 is driven by belt drive 108 and to maintain the consistency of rotation indicated in FIG. 2, it moves in the direction of arrow 110. The carrier mechanism 32 is able to determine when it approaches the car rail 44 by means of an optical reflector 72 disposed on the underside of car rail 44 cooperating with a photoelectric light source 112 (see FIG. 3) positioned on the front panel 114 of the irrigation car 46. The electronics or computer 116 device is disposed within the irrigation car 46 just behind panel 114 and preferably is mounted on a printed circuit board 118 in a conventional manner. The function of the computer and the associated light source 112 in combination with the optical reflector mechanism 72 will be explained hereinafter.

The alignment of the carrier mechanism 32 is insured by the upwardly extending bracket 120 disposed on the front portion 122 of the carrier mechanism 32 and is provided with a forward extending alignment wheel 134 which is guided into position by a pair of V-shaped guide rails 126 disposed in line with car guide rail 44 and the extension portion 45 of car rail 44 which is affixed to the carrier mechanism 32. The extension portion 45 is positioned directly in line with car rail 44 with a relatively small gap 128 disposed therebetween to enable the irrigation car 46 to transfer to rail 44.

Also included on the carrier mechanism 32 is a follower arm 130 which comes into contact with the power cable 30 and continually applies pressure to the power cable 30 (wires) and thus, the trolley mechanism 132 (see FIG. 1) attached to cable 30 is caused to move within the electrical power strip 28 as the carriage mechanism 32 is moved along the carrier rail 36.

Once the carrier mechanism 32 is in position as indicated by the alignment determined by the guide brackets 126 and the outwardly extending wheel 134 (see FIG. 5) positioned on bracket 120, and the optical alignment determined by reflector 72 and light source 112, the electronic computer device 116 permits the plunger mechanism 52 to engage the water valve 42 (see FIGS. 7 and 8) locking the carrier mechanism 32 in position and completing a water flow path from water pipe 40 through water valve 42 plunger pipe 136 onwardly through hose 66 connected on the end thereof. Hose 66 extends over the top portion 140 of the irrigation car 46 proximate the driving gear 100 which preferably has a truncated guide wheel 142 affixed on the outwardly extending portion of driving gear 100 (see FIG. 4). Hose 66 meets with the hose wheel assembly 154 causing the hose 66 to be payed out along the car rail 44 whenever the irrigation car moves out along the rail as will be explained hereinafter. A water take off hose 256 is provided on the plunger pipe 136 which is used to control the latching mechanism 146 (see FIGS. 10 and 11) described hereinafter.

The carrier mechanism 32 with the irrigation car 46 disposed thereon together with the rail extension portion 45 travels along carrier rail 36 by means of the wheels 74, as explained earlier. The irrigation car 46 travels along car rail 44 by means of wheels 100 and 148 and have attached to the same axle a timing mechanism 150 which may be fixed over apertures 152 provided in wheel 151 or alternatively it may be placed on another timing wheel fixed on the same shaft, not shown. A detailed description of the timing mechanism 150 will be described in conjunction with FIG. 3A.

The irrigation car 46 also includes thereon a reel housing 154 upon which the hose 66 is wound. In the present embodiment it is contemplated that up to 150 feet of hose may be stored on the reel housing, thus permitting the car rail 44 to extend out a full 150 feet from the carrier rail 36 providing an irrigation path extending essentially the total length. The hose 66 is payed out as the irrigation car 46 moves along car rail 44 and it is rewound unto the reel housing 154 as the irrigation car reverses and returns to its start position on the carrier rail 36.

Although only typical C-brackets 38 have been shown supporting the carrier rail 36 and C-brackets 50 have been shown supporting the car rail 44, it is to be understood that the required number of brackets may be utilized in order to maintain the carrier rail 36 and car rail 44 in a relatively rigid position. The C-shaped brackets 38 and 50 are suspended from overhead cross beams 48 which are disposed wherever necessary along the length and width of the building if a suitable railing structure is not present as supports for the building superstructure 22.

Figure 9:
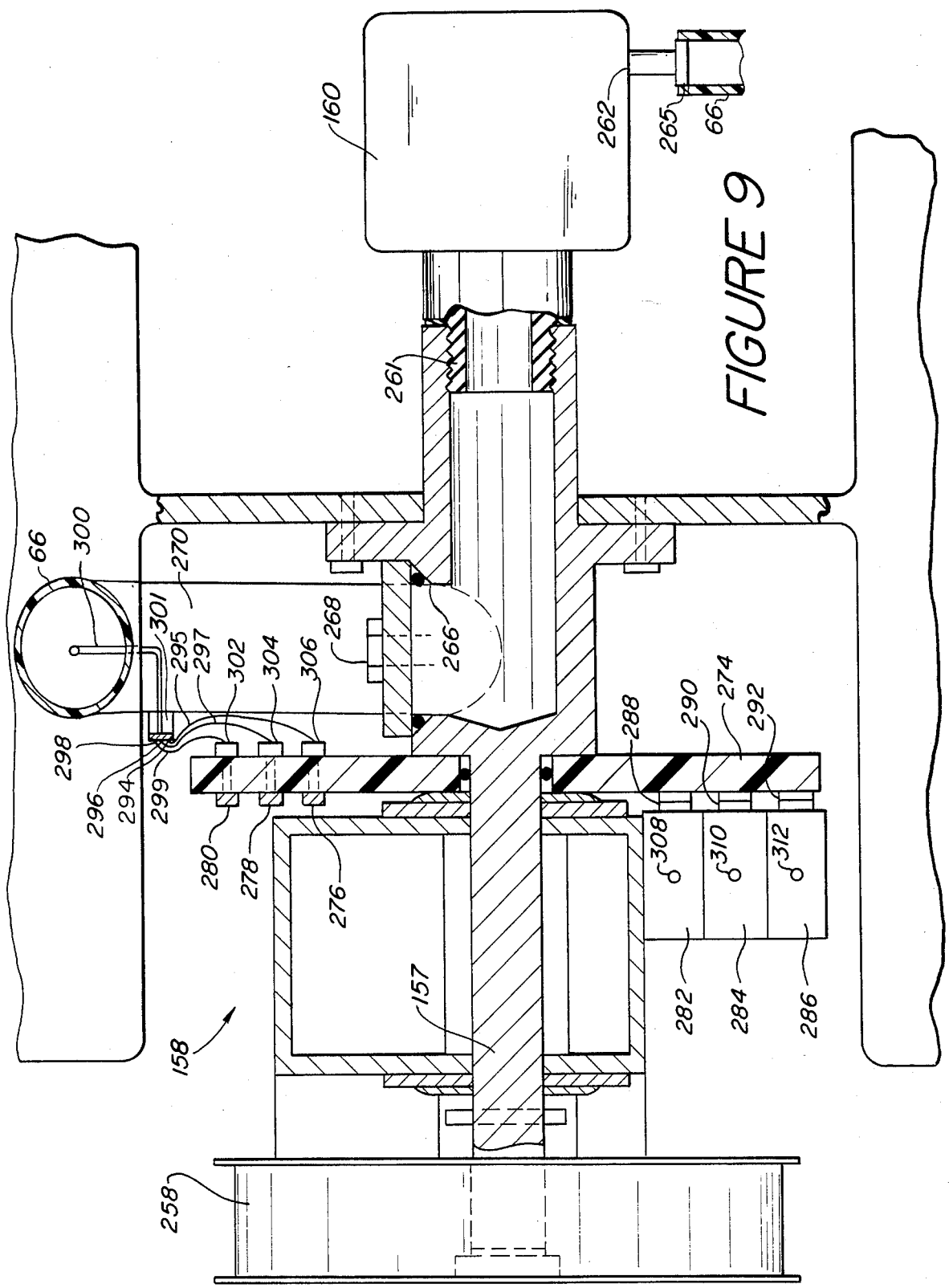
FIG. 9 is an enlarged partially cross-sectional view in elevation, not to scale, of the rotatable water union and communicating contacts located in the hub of the hose reel housing.

FIG. 3 is a side view in elevation showing the irrigation car 46 in its position on the car rail 44 and in particular discloses the reel housing 154 having an axle 157 which is hollow and includes therein a slip ring assembly 158 shown in FIG. 9 that also includes a water take-off union 160 (rotary coupling) permitting the electrical contacts that supply the voltage to the drive motor 102 and the water flowing in hose 66 to exit the hose and enter the water spray boom 58 (front and rear) upon which the spray heads are affixed.

The irrigation car 46 also includes a reciprocating shuttle arm 164 driven by a belt 380 and pulley wheels 378 and 382 connected to the clutch shaft 374 which will cause the hose 66 to be evenly distributed over the width of the reel housing 154 as it moves in the direction of arrow 170. (See FIG. 15) Thus, the hose 66 is carefully placed in reel housing 154 when it is moved in the direction of arrow 170 (toward the initial or start position proximate carrier rail 36).

The power for the reciprocating shuttle arm may be traced back to drive motor 102 and its associated gear box and will be described in detail in conjunction with FIG. 15. Guide wheels 172 and 174 insure a smooth path for the traveling of hose 66 as it approaches the reciprocating shuttle arm 164 on its way towards the reel housing 154. A typical hose feed and rewind system may be purchased from Norco, Inc., Georgetown, Conn., Model #1715 and Polyclutch Corp., North Haven, Conn., Model #5A0-32 for the level winder and slip clutch assemblies, respectively.

Pulley wheel 176 and belt 178 are used to drive the reel housing 154 permitting the hose to be payed out behind it as it moves along the rail 44.

Figure 3A:
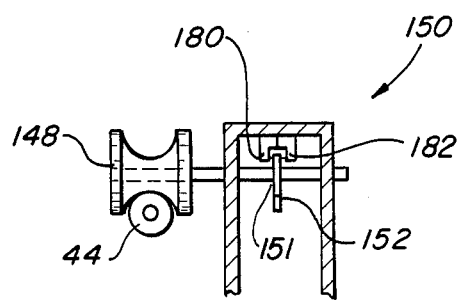
FIG. 3A is a partial front sectional view in elevation of the speed detector mechanism disposed on the irrigation car.

A timing mechanism, shown in FIG. 3A, is of fairly conventional design and utilizes a wheel 151 which is provided with a plurality of apertures 152 and a light source 180 is disposed on one side thereof with a photoelectric detector 182 disposed on the other side of wheel 151. The light emanating from the light source 180 travels through the apertures 152 provided in the wheel 151 and when it impinges upon the photoelectric detector 182 provides an output voltage which is connected by means of a cable, not shown, to the computer device 116 which utilizes this information to provide an indication of the speed that the irrigation car is moving and thus, by changing the speed of drive motor 102, may control the amount of water being dispersed along the irrigation path.

Figure 4:
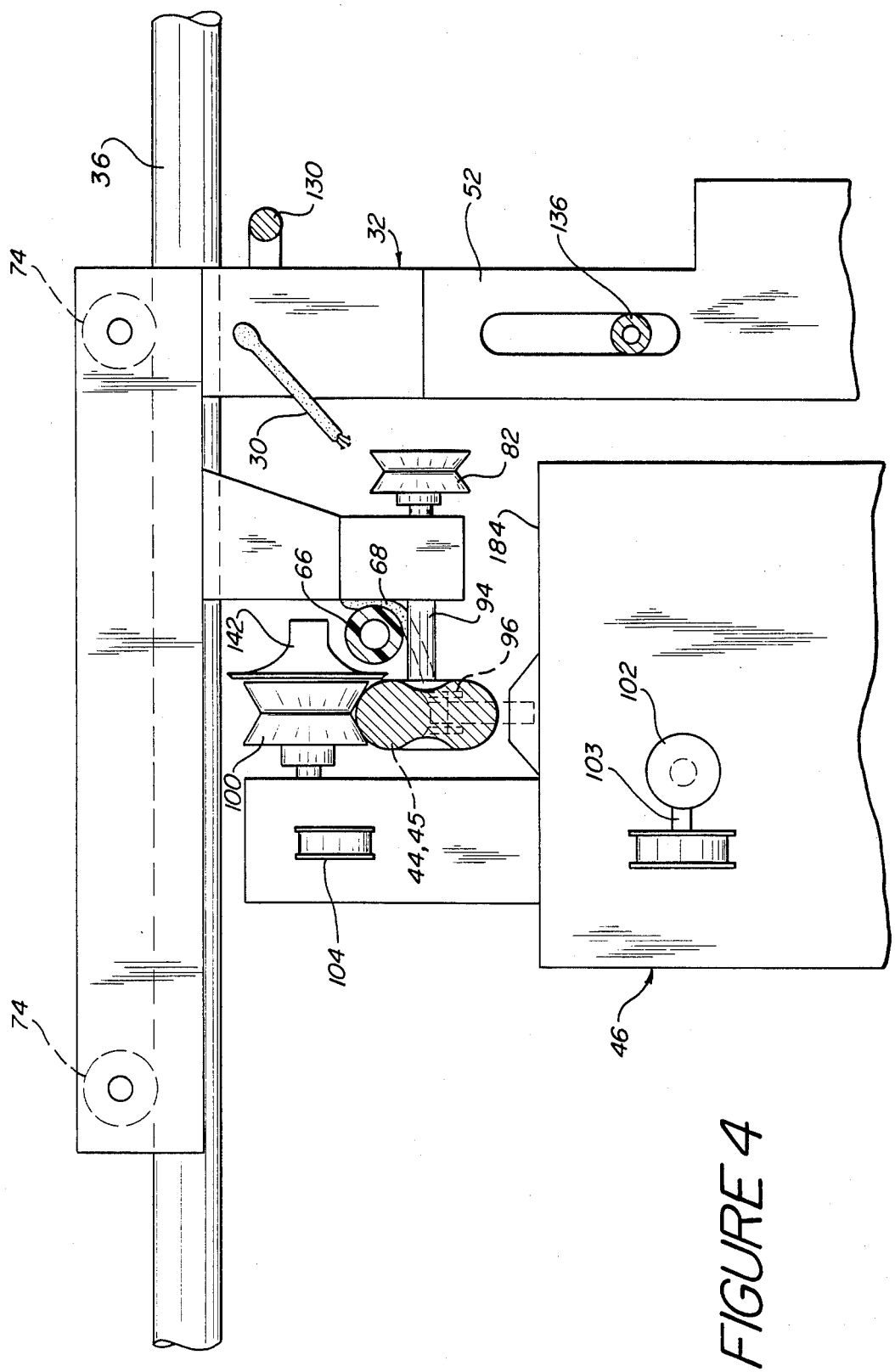
FIG. 4 is an enlarged rear view, in elevation, of the carrier mechanism and irrigation car partially broken away showing the interaction and their positions relative to each other.

FIG. 4 is a rear view of the irrigation car 46 in position on the carrier mechanism 32. By utilizing a partial enlarged view as is shown herein, a clearer indication as to the relative position of the different components is obtained. The stopping or detachment mechanism appears on the upper surface 184 of irrigation car 146 and will be explained in detail in conjunction with FIGS. 10 and 11. FIG. 4 does not include any of the belt drives but includes the position of the drive pulley gears and friction gears, thus giving a more clear picture as to the driving and functioning mechanism of the irrigation car 46 and the carrier mechanism 32.

Referring now to FIG. 5 there is shown a partial side view of the irrigation car 46 with portions broken away for clarity. The position of the carrier mechanism 32 while suspended on rail 36 becomes apparent and the relationship of the irrigation car 46 with regard to the carrier mechanism may be clearly observed. The hose 66 paying off from the reel housing 154 passes over wheel 172 and as the irrigation car 46 moves in the direction of arrow 186. The hose 66 moves alongside wheel 100 and then down to the axle or hub assembly of the reel housing 154, thus carrying the water to where the water take off union (rotary coupling) 160 is located. Coupling 160 is described in detail in FIG. 9. The guide rails 126 are seen affixed by a conventional bolt 188 and nuts 190, 192, 194 and 196 to the overhead rail 48. The connection shown is of a conventional nature and is utilized to hold the C-shaped brackets as well, as required. Preferably the lower portion of C-shaped brackets 38 and 50 are provided with a U-channel support 198. This provides for a more rigid support of the round support rails 44 and 36.

The position of hose 66 as it is payed out along irrigation rail 44 is clearly shown in FIGS. 6 and 6A. A hanger bracket 68 is affixed to the underside of rail 44 and the hose 66 is held in position by the hanger bracket 68 as it is payed out when the irrigation car 46 moves along rail 44. Bracket 68 helps support the hose in addition to the C-shaped support brackets 50.

Figure 7:
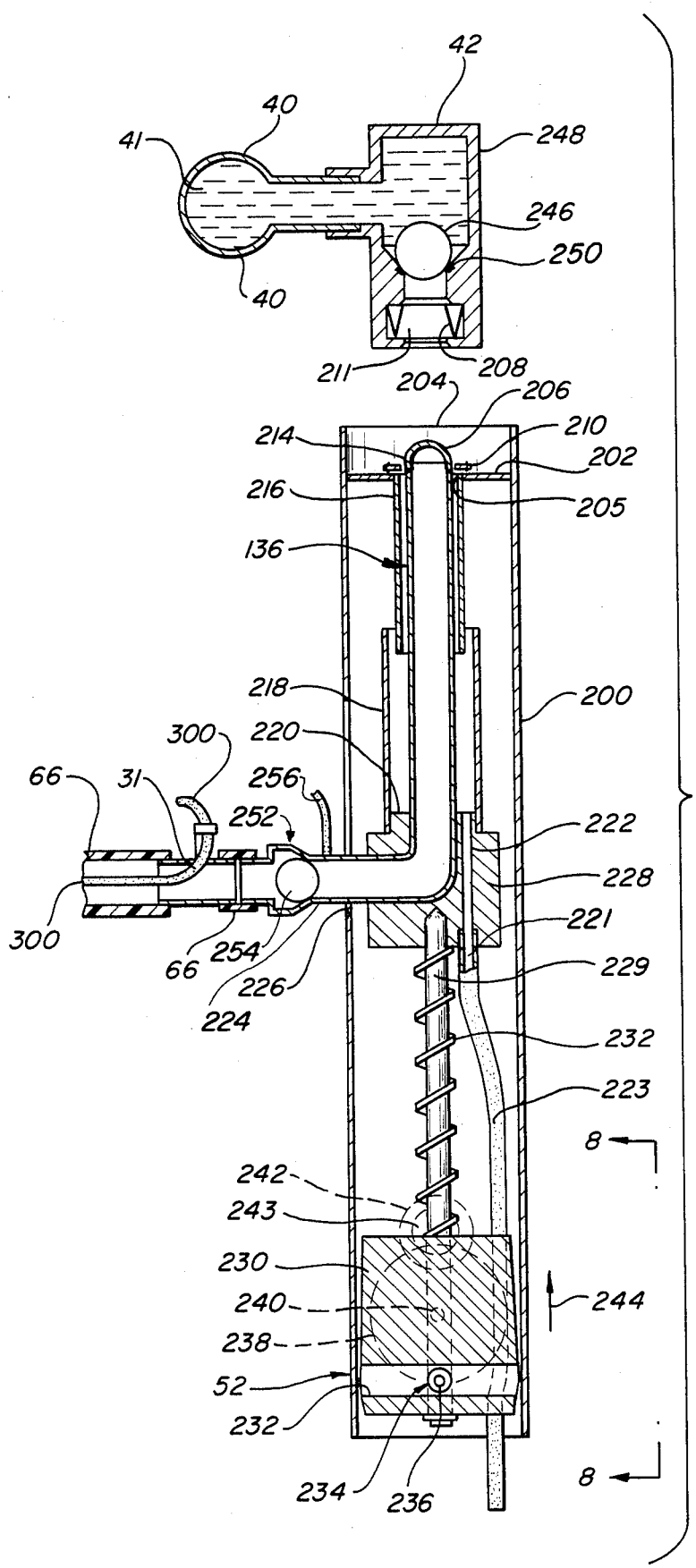
FIG. 7 is an enlarged cross-sectional view of the water valve mechanism and a cooperating water coupling plunger mechanism.

A cross-sectional view in elevation of the plunger mechanism 52 is shown in FIG. 7 and it can be seen that the plunger assembly includes a housing 200 into which is mounted a shelf 202 having a centrally disposed opening 205 removed from the edge 204 of the housing 200. The shelf 202 together with the housing edge 203 forms a reservoir or overflow catch basin for any water which may leak or seep past the seals 208 utilized in the mating water connector valve 42. Extending within the valve opening 205 is a U-shaped bracket 206 affixed to a tubular plunger pipe member 136 which functions as the valve opening probe and mates with the receptacle or V-seal 208 provided proximate the exit orifice 211 of valve 42. A guide plate 210 having an oval opening 214 is mounted to shelf 202 in a conventional manner, and enables the plunger pipe 136 to move freely within the oval opening 214 provided in the plate 210. Shelf 202 is also provided with a tube 216 which surrounds the opening 205 and extends downwardly therefrom until it is received by a telescoping tube member 218 which functions as a carrier for any overflow water which may be captured in the reservoir and flow within tube 216. Tube 218 is provided with a closed end 220 having an exit aperture 221 into which is affixed a drain tube 222. Drain tube 222 is provided with a flexible drain hose 223 which extends downwardly beyond the plunger mechanism 52 and permits overflow water to drain down to the irrigation path.

Plunger pipe 136 is generally L-shaped in cross-section with the lower portion 224 thereof extending outwardly from an elongated opening or slot 226 provided in the housing 200. Slot 226 is elongated sufficiently so that the lower portion 224 of plunger pipe 136 may move freely its entire length of travel. Lower portion 224 is also embedded and affixed to a pusher block 228 which is disposed within the housing 200. Emanating from the bottom of the pusher block 228 is a rod member 229 which has a coil spring disposed therearound that has one end resting against the pusher block 228 and the other end resting against a driver or cam follower block 230 disposed proximate the other end of housing 200. Block 230 is provided with a channel 232 disposed along its width and a roller gear 234 is placed within the channel or slot 232 to move freely therein. The axis 236 of roller gear 234 is connected to the periphery of a drive gear 238 which in turn is mounted on a shaft 240. A driving gear 143 engages gear 238 which is mounted on the output shaft of an auxiliary motor 242 that is activated by a signal received from the computer device 116 that occurs only when irrigation car 46 is in its home or start position on the carrier mechanism 32 and the carrier mechanism is aligned in position with a car rail 44. When auxiliary motor 242 is activated it causes roller gear 234, that has its axis 236 affixed proximate the periphery of gear 238, to rotate in an upwardly direction as shown by arrow 244 and therefore, will move the cam follower block 230 in the direction of arrow 244 as well as the shaft 229. Shaft 229 which has pusher block 228 affixed thereto and plunger pipe 212 also affixed thereto moves in the direction of arrow 244, thus moving the valve opening probe bracket 206) in the same direction where it will enter the V-seal 208 until it moves sufficiently high to raise check-ball 246, which has been holding back the water under pressure in valve housing 248 of valve 42. Check ball 246 is seated on an O-ring 250 when not urged away from its seat by the valve opening probe or plunger bracket 206. Once the water starts to flow through the now open exit orifice 211 of valve 42 the water will exit plunger pipe 136 and flow into hose 66.

Plunger pipe 136 is provided with a section 252 that has a ball check arrangement 254 disposed therein which prevents any back flow of water. The ball and check arrangement 254 and small water take off hose 256 is used as a positive check in order to insure that the irrigation car 46 can not leave the carrier mechanism 32 unless the plunger pipe 136 has been properly engaged into valve 42 and at the same time locks the carrier mechanism 32 in position. The function thereof will be explained hereinafter. The water pressure occurring in the section 252 acts to release the irrigation car's attachment/detachment mechanism (locking mechanism) 146 as will be explained hereinafter in conjunction with FIGS. 10 and 11.

Plunger pipe 136 is also provided with a T-shaped connection terminated in a pressure feed-through terminal connector 31 to which an electrical conductor cable 300 is connected, thereby feeding the cable 300 through the water carrier hose 66. (see FIG. 7)

FIG. 8 is a partial side view in elevation of the driving mechanism for the plunger mechanism 52 showing the interconnection of the lifting portion of the mechanism.

FIG. 9 is a partial cross-sectional view in elevation of the hub assembly portion 156 of the hose reel housing 154. The axle 157 of hub assembly 156 includes a sprocket pulley wheel 258 affixed to the axle 157 which extends laterally and, on the other end thereof is threaded into the water take-off union 160 by means of threads 261. The output orifice 262 of union 160 has a metal externally threaded adapter 265 onto which a hose 264 is affixed thereon, in a conventional manner (see FIG. 3), that is connected to a T-coupling 266 with the outputs thereof being coupled to the front and rear booms 58 used for watering. The input orifice 266 of reel shaft 157 has affixed thereon by means of bolts 268 a curved, preferably metal, tube 270 that extends outwardly from the hub 156 and is affixed to the end of hose 66, in a conventional manner, forming the lower most starting position of the hose on the reel assembly 154. A typical water take-off union is manufactured by Deublin Cartridge, Inc. of Northbrook, Ill., known as Model No. 6075-001-134.

Affixed to the reel shaft 157 of the reel housing 154 is an insulated slip ring plate 274. Plate 274 is disc-shaped and is provided with three slip rings, 276, 278, and 280 fabricated from a metallic material and against which, in intimate contact therewith, are contacts or brush holders 282, 284 and 286 that are of conventional design and contain spring loaded brushes 288, 290 and 292 which are kept in intimate contact with rings 276, 278 and 280, resectively. The electrical power consisting of three wires, 295, 297 and 299 of cable 300 are connected to slip rings 276, 278 and 280, respectively, via feed through terminals 302, 304 and 306, respectively, and thus, via terminals 308, 310 and 312 on brush holders 282, 284 and 286 supply, the necessary electrical power for use by the computer device 116, optical circuitry 112 and 113, motor 102 and any other control circuitry as needed, as will be explained hereinafter.

The electrical power in cable 300 is transferred from within the hose 66 by means of pressurized take off connector 301 which includes terminals 294, 296 and 298. Terminals 294, 296 and 298 are connected by wires 295, 297 and 299, respectively, to terminals 302, 304 and 306, which are in contact with slip rings 276, 278 and 280.

Pulley wheel 258 affixed on axle 157, is connected by means of a belt 178 to pulley wheel 176 for driving power.

FIGS. 10 and 11 are enlarged partial views of the upper portion of the irrigation car 46 partially broken away concentrating on the latching/detaching mechanism 146. A carrier stop 318 is affixed in a conventional manner to the extension portion of carrier rail 45 and is provided with a rubber bumper 320. The location of bumper 320 on extension rail 45 is positioned so that when the stopping block 322 affixed to the upper surface 184, of car 46, comes into contact with bumper 320, the toroidal drive wheel 96 will come into frictional contact with driving gear 100, thus placing the irrigation car 46 in its home or start position. Latching bar 324, with the pressure exerted by spring 326 which has one end thereof restrained by termination block 328 and the other end thereof pushing pusher block 330, which is in intimate contact with the ball shaped end 332 of latching bar 324, holds bar 324 in its most downwardly position, thus causing latching bar 324 to come into contact with stopping bar 322 affixed on the upper surface 184 of irrigation car 46 thereby preventing the irrigation car 46 from being moved to the right in the direction of arrow 334 where it can leave the extension rail portion 45 which is affixed to carrier 32, and move on to car rail 44. Thus, it can be seen that irrigation car 46 will be locked in its home or start position unless the latching bar 324 can be moved to its alternate position as shown by arrow 336. This can be accomplished by pusher block 330 moving in the opposite direction and urging the ball shaped end 332 of latching bar 324 to move in the direction of arrow 338 with sufficient force to overcome the pressure exerted by spring 326 against pusher block 330. This is accomplished by having water under pressure flow into hydraulic cylinder 340, via hose 256, which has its other end connected to the T-section 252 provided on plunger pipe 136.

Thus, when the water under pressure exits the plunger pipe 136 and provides water under pressure to hose 66 it also provides water under pressure to hose 256 thereby releasing (detaching) the latching/detachment mechanism by rotating latching bar 324 about its axis 325 to its alternate position permitting the irrigation car 46 to leave extension rail portion 45 and removes driving wheel 100 from friction contact with toroidal drive wheel 96. The mating of plunger pipe 136 with valve 42 causes the carrier mechanism 32 to remain in a fixed position and permits the driving wheel 100 and wheel 148 to propel irrigation car 46 along rail 44 as described earlier. The detachment and latching mechanism 146 is positioned within rail 45 so that there is no protruding surfaces that could interfere with the action of the driving gear 100.

FIG. 11 is a bottom view of the detachment and latching mechanism 146 shown in FIG. 10. Latching bar 324 rotates about an axis 325 provided in downwardly extending block 327. The ball shaped end 332 of latching bar 324 is free to move in the slotted aperture 329 when it moves from its locking or latching position to its release or detachment position shown in dotted lines in FIG. 10.

Figure 13:
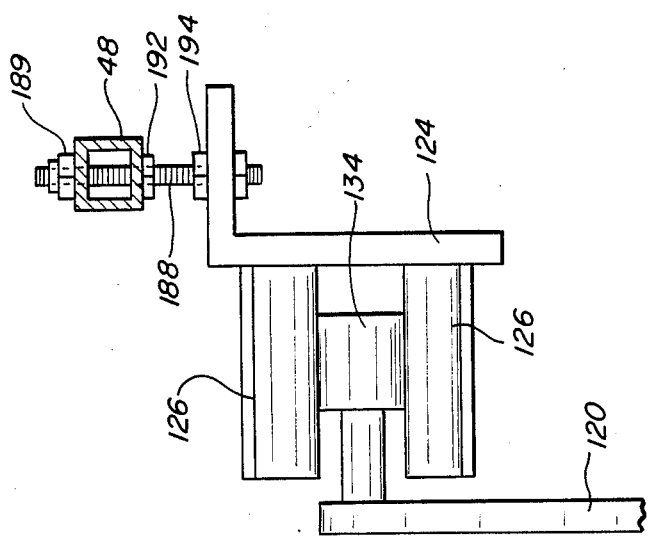
FIG. 13 is a front view in elevation of the alignment mechanism partially broken away taken along the line 13—13 of FIG. 12.
Figure 12:
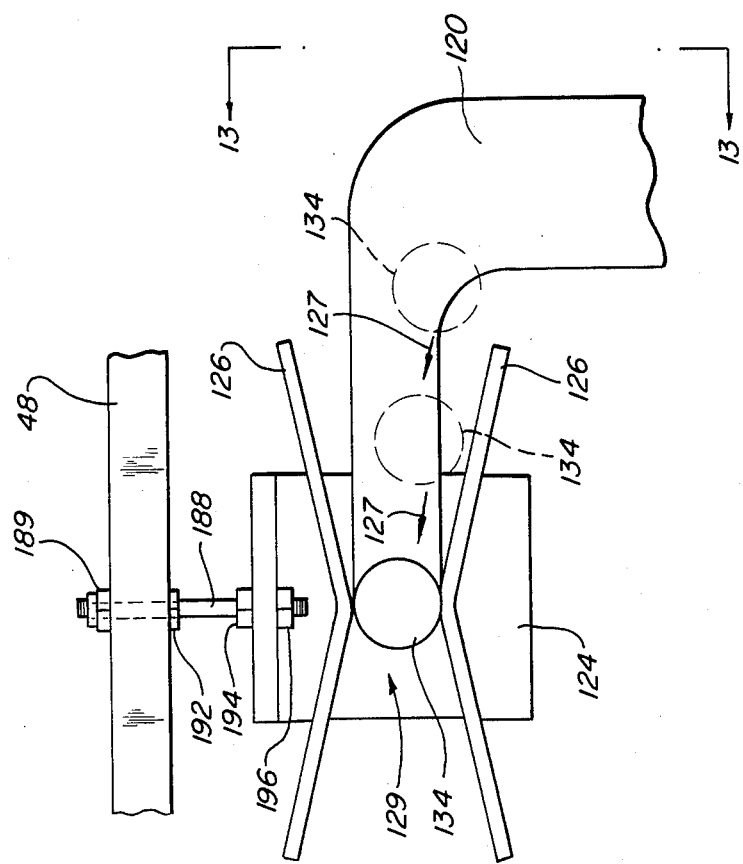
FIG. 12 is a side view in elevation, partially broken away, of the alignment mechanism which aligns the carrier as it approaches an irrigation rail position.

The alignment mechanism 124 shown in FIGS. 12 and 13 includes a pair of guide rails 126 into which the guide wheel 134 enters as the carrier car 32 reaches the rest, home or start position. The guide wheel 134 approaches the home position as shown by the wheel in broken lines as it moves in the direction of arrows 127 wherein the narrowing portion 129 coincides with the rest, start or home position aligning carrier rail 45 with rail 44. When the carrier mechanism 32 approaches this point the programming computer 116 is notified of its arrival thereto by receiving a reflected light signal 184 reflected from reflector 72 placed on the underside of car rail 44, (see FIG. 10) thereby starting a sequential series of events which permits the plunger 52 to attempt to enter valve 42 as explained earlier. L-shaped bracket 124 is affixed by means of a bolt 188 and nuts 189, 192 and 194, as previously described to cross beams 48 in a conventional manner and is mounted in line with the carrier rail 44 as explained earlier.

Figure 14:
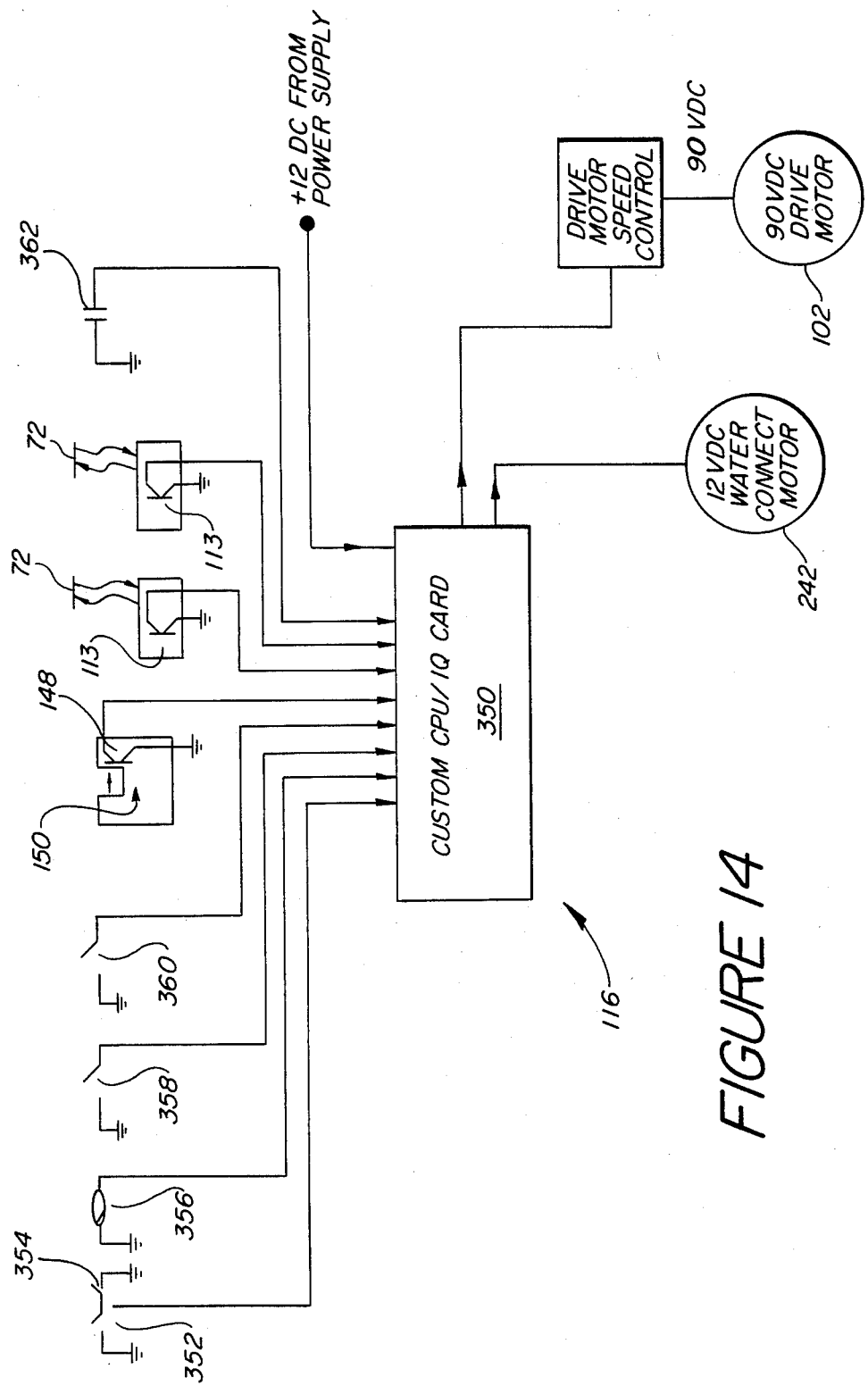
FIG. 14 is a functional block diagram of the programmable computer system embodied in the instant invention.

References have been made herein several times to an optical reflector 72 and a light source 112 and a photoelectric detector 113. These devices are of conventional design and the reflector may be of any suitable type well known in the art, such as, for example, a typical bar code or what is more commonly known as the standard UPC bar code and the information obtained therefrom may be used to program a programmable computer 116 disposed on the printed circuit board 118, as explained earlier. It is also feasible to have manual controls whereby the driving motor 102 may have a remotely held manually controlled on/off switch operate the irrigation system as well as any other functions, which are presently performed by the computer. The typical functions performed by the control computer device 116 is explained in conjunction with FIG. 14 which depicts a functional block diagram of the computer mechanism 116. A typical optical and reflective system suitable for use in the instant invention is of the type known as Model No. 502A, manufactured by the Banner Engineering Corp. of Minneapolis, Minn.

A typical control computer requires a central processing unit into which the signals consisting of 1's and 0's occurring from various switches or detectors positioned as will be described hereinafter provide either a ground (0) to the input terminals of the central processing computer 350, which as stated earlier is part of the computing device 116 mounted on printed circuit board 118. The sensors or detectors by providing a ground couple what is known as a zero condition to the input terminal of the CPU and the open circuit condition, interpreted by the computer as the one position which is in operation is generally plus 5 volts.

Collision sensing switches 352 and 354 are disposed on the watering booms 58 front and rear (see FIG. 3) and thus, when the booms come into contact with an object in their path will change from their normal condition zero or one, to the opposite condition which is processed by the computer in a manner so as to stop drive motor 102. The following functions are provided by switches and/or sensors and are coupled into the computer, thus, causing the computer to provide an output signal to activate or deactivate an appropriate device or provide an audible signal. A tilt limiting switch 356 provides a signal to the central processing unit (CPU), if the irrigation car 46 were to be tilted beyond the acceptable limits and/or the booms interfere with something which causes them to tilt more than is desired. A mechanical park limit switch 358 also provides a signal to the CPU when the irrigation car 46 is properly parked on the carrier mechanism 32. In addition a latch limit switch 360 tells the CPU that the latching/detachment mechanism 146 has been engaged or released. By providing a group of timing pulses from the photoelectric detector 182 obtained from the timing mechanism 150, the speed of the irrigation car 46 may be maintained. (FIG. 3A) By utilizing the photoelectric detector 113 and reflector 72 the location of the carrier car carrier mechanism 32 may be readily indicated to the computer and thus an output signal can be provided for the next desired function. Hereagain, a detector and reflective device utilizing a code having a distinctive number of bars or particular arrangement thereon may be fed to the computer and instruct the computer to change the speed watering or operate any of the other control mechanisms as desired.

The circuitry utilized in the central processing unit and computer to perform these functions is well known in the art and beyond the scope of the present disclosure. A typical CPU may be purchased from Entertron Industries, Inc. of Gasport, N.Y., Model No. SK 1600. However, it is to be noted that the central processing unit may contain any number of features such as e.g. a voice activated control, audio alarms, etc., which are well known in the art, all controlled by sensors and/or switches coupled to the central processing unit. The CPU is capable of providing the required outputs as desired, when combined with other power amplifying and/or switching devices. Also, it is to be noted that a manual or automatic start switch 362 may be incorporated for starting the system. Although the essential functioning outputs are shown coupled the manner connecting other functions to the system from the CPU, is well known in the art.

As presently configured, the system includes inputs relating to: start; stop; pause (manual or automatic); home; carrier rail end; spray car rail end; and carrier approach to car rail position; water pressure switch; spray car parked switch; spray car latch switch; tilt switches; collision switches; reflector reader; rail alignment switch; tachometer (wheel provided with holes and electrical light and photo detector combined); job number selector switch; power failure switch; and manual interrupt switch and/or timer.

The output of the CPU provides control pulses which may start the remotely located water pump in order to pressurize the input water, provide an audible buzzer alarm for a malfunction; operate a water valve, provide power to the main drive motor and auxiliary motor, reverse motor direction, change motor speed, and indicate that a row has not been completed. These are typical functions and any additional functions may be incorporated depending upon the needs and desires of any individual system.

Referring now to FIG. 15 there is shown a pictorial representation of the driving system as set forth in the embodiment described hereinbefore. The main support rail 44 supports the irrigation car 46 once it leaves the carrier mechanism 32 and is driven by drive wheel 100 resting upon rail 44. Drive wheel 100 has affixed on its shaft a pulley wheel 104 which is coupled by belt 108 to wheel 103 which is affixed to the output shaft 365 of drive motor and gear box 102. Thus, when drive motor 102 is energized, power is transferred to driving wheel 100 enabling the irrigation car 46 to move along rail 44 in the direction of arrow 364. Coupled on the output shaft 365 of motor 102 is a pulley 370 connected by means of a belt 372 to pulley 174, 168 and slip clutch 368, containing cam clutch 369 which is normally disengaged. Cam clutch 369 is manufactured by The Torrington Company of Torrington, Conn., known as a drawn cup roller clutch. The shaft 374 of slip clutch 368 has sprocket pulley 176 affixed thereon at one end and is coupled by means of belt 314 to sprocket gear 258 which is affixed to the shaft or axel 157 of reel housing 154 and thus, provides for the unreeling of the hose 66 in the direction of arrow 376. Also mounted on shaft 374 is a brake mechanism 366 containing cam clutch 367, (which is the same type as cam clutch 369), which supplies tension on the hose 66. Sprocket pulley 378 is connected by belt 380 to sprocket pulley 382 which provides power for the reciprocating cam mechanism 164 which level winds the hose when paying out or reeling in and is part of the reciprocating shuttle arm assembly 164 described earlier.

When the irrigation car 46 is moving in the direction of arrow 364, paying out hose the driving cam clutch 369 overruns and does not provide drive to the reel housing 154. The brake cam clutch 367, which brakes the shaft in one direction only, holds back the reel housing 154 from running free and paying out additional hose 66. If a sudden stop should occur the reel housing 154 would attempt to overrun the drive cam clutch 369 which then would act as a brake keeping the reel from paying out additional hose.

When the irrigation car 46 is moving in the reverse direction the brake cam clutch 367 overruns and the driving cam clutch 369 drives the reel through the slip clutch 368 thereby allowing the reel speed to vary as the hose builds up.

In operation, the system is connected preferably to a source of AC electrical power 28 in addition to a source of pressurized water, via a water pipe 40 provided with water valves 42 as explained earlier. The carrier car 32 with the irrigation car 46 disposed thereon is placed upon overhead rail 36. The system is turned on either remotely or by a manual control switch and the computer central processer unit (CPU) 350 is automatically cleared and reset for start up and eliminating any false inputs or transients which may occur. The CPU will signal the remote water pump to pressurize the water system (if it is utilized) and then the computer will check by means of observing the optical system to determine where the carrier mechanism 32 is located, such as the beginning, start or home position. Once determining that it is in the proper start position, the CPU will provide driving power to motor 102 which then, moves the carrier mechanism 32 along carrier rail 36 to a position wherein an optical indicator 72 locates the position of a car rail 44 and signals the auxiliary motor to start the plunger mechanism 52 to engage the water valve 42. Once engagement has occurred, with water pressure appearing in hose line 256 the latching/detaching mechanism 146 releases the irrigation car 46 and permits it to move along rail 44. If for any reason, the valve connection has not been properly made to the plunger, the pressure would not appear in line 256, and after several tries an audible signal is provided indicating to personnel in audible range that there is a fault condition occurring in the operation of the system.

As explained earlier, the electrical power to the irrigation car 46 is transferred from the source of electrical power 28 to the carrier mechanism or car 32, via the water flow path provided in the hose 66. The electrical take-off is accomplished by means of a pair of pressure feed through terminals or connectors 31 provided on both ends of the hose 66. Thus, the cable 300 is positioned in the center of hose 66 and continues the complete length thereof transferring the electrical power from the power strip 28 to the carrier car 32 to the irrigation car 46 where it is connected to the printed circuit boards 118 upon which may be mounted transformers or converters for obtaining DC voltages is accomplished, in a conventional manner, and thus, the voltages for providing the CPU are obtained. Once the irrigation car 46 leaves the rail 45 and starts on its journey along rail 44, various reflectors 72 having different coded information thereon such as job number, motor speed, (vary the amount of water to be dispensed); e.g. forward and rear booms 58 being activated separately or together to control the amount of water to be dispersed on the skids 24 placed therebelow. Upon the irrigation car 46 reaching the end of its travel, a switch 358 and/or an electrical reflector 72 provides a signal for the CPU 350 indicating that it is time to reverse the direction of drive motor 102. When the carrier car 46 returns toward its home position (it may be dispensing water or not depending on the optical reflector 72's instructions) the irrigation car 46 reaches its home position and nests upon carrier mechanism 32. Once the CPU is informed, again by an optical signal, and an electrical/mechanical signal that the latch has been completed, the CPU will permit the drive motor 102 to continue to operate permitting the carrier mechanism 32 to obtain the needed drive for toroidal drive wheel 96 so that it can move along the carrier rail 36 until it approaches the next car rail 44 signaled by another optical reflector 72, wherein the process is repeated again and again. The limiting factor of the present system relates only to the amount of hose that can be carried by the carrier reel housing 154, and in the present design it may carry up to 150 feet. The number of aisles or rails 44 which can be used to provide irrigation paths is only limited by the length that the water pipe may be extended and thus, depends upon the availability of water pressure along the extended line.

Hereinbefore, has been disclosed a programmable sprinkler system which is reliable, easy to operate, provides a unique function by permitting an infinite number of watering paths to be obtained without having to manually disconnect and connect water outlets and can accommodate any desired number of water outlets as long as sufficient water pressure exists. Although the length of the irrigation paths in the present design is limited to 150 feet, there is no reason why this cannot be extended further distances by providing additional capability on the hose reel assembly or reducing the diameter of the hose.

It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention what is claimed is:

1. A programmable sprinkler system comprising, in combination:
   (a) first overhead rail means;
   (b) pipe means adapted to be coupled to a source of water under pressure, said pipe means having a plurality of water valve means disposed at discrete intervals along its length and extending outwardly therefrom, said pipe means being disposed proximate said first rail means and parallel thereto;
   (c) a source of electrical power disposed proximate to and generally parallel with said first rail means extending essentially the entire length thereof;
   (d) a plurality of second overhead rail means, each one of said plurality of second rail means having one end thereof disposed proximate said first rail means and each said valve means, the other end of each said second rail means extending away from said first rail means defining a path along which said water is to be dispensed;
   (e) carrier means disposed on said first rail means, said carrier means including;
      (i) first moving means for moving along said first rail means,
      (ii) first coupling means for coupling to said source of electrical power, and
      (iii) means for coupling to each said water valve means, and
   (f) detachable car means, said car means being disposed upon said carrier means and including;
      (i) second coupling means for coupling to said source of electrical power,
      (ii) second moving means for moving said car means along each said second rail means,
      (iii) means for dispensing said water,
      (iv) means for providing a continuous water flow path to said dispensing means, said continuous water flow path means being connected between said water valve coupling means and said water dispensing means, and
      (v) driving means connected to said second coupling means; and
   (g) programmable means coupled to said car means for determining the amount of said water to be dispensed along each said path defined by each said plurality of rail means.

2. A programmable sprinkler system according to claim 1 further including;
   (a) means for controlling the rate of movement of said carrier along said first rail means.

3. A programmable sprinkler system according to claim 1 further including;
   (a) means for controlling the rate of movement of said car means along said second rail means.

4. A programmable sprinkler system according to claim 1 further including;
   (a) means for controlling the rate of movement of said carrier along said first rail means; and
   (b) means for controlling the rate of movement of said car means along said second rail means.

5. A programmable sprinkler system according to claim 1 wherein said water valve means comprises:
   (a) receptacle housing means connected to said water pipe means said receptacle housing means having an O-ring seat in its exit orifice, said O-ring seat being made of a material different from said housing means,
   (b) ball check valve means, said ball check valve means including a ball, said ball being urged against said O-ring seat by said water under pressure, whereby when said ball is dislodged from said seat by a mating member, said water is permitted to flow through said housing exit orifice.

6. A programmable sprinkler system according to claim 1, wherein said water valve coupling means comprises:
   (a) housing means including;
      (i) movable hollow plunger means having one end providing a protruding portion extending beyond the edge of said housing in a second position and adapted to be received and cooperate with said water valve means, said plunger means, when properly received by said valve means, providing a continuing water flow path from said water valve means, the other end of said plunger means being connected to said water flow path means,
      (ii) means for moving said plunger means from a first rest position to said second extended position,
      (iii) reservoir means disposed about said plunger protruding end;
   (b) run-off means connected to said reservoir means and disposed over said path to be watered; and
   (c) gear driving means coupled to said moving means for causing said moving means to move said plunger from said first position to said second position.

7. A programmable sprinkler system according to claim 1 wherein said source of electrical power comprises:
   (a) housing means being generally U-shaped in cross-section and having a pair of electrically conductive parallel tracks disposed therein extending the length thereof, said pair of tracks adapted to be connected to a pair of electrical power source terminals;
   (b) trolley means being disposed within said generally U-shaped housing means and movable along the length of said housing means, said trolley means having a pair of electrically conductive contacts in contact with said pair of conductive tracks; and
   (c) third coupling means extending out of the opening of said generally U-shaped housing means providing an electrically conductive path pair for coupling said pair of power source terminals to said carrier means.

8. A programmable sprinkler system according to claim 1 wherein said carrier moving means and said car moving means include a single driving motor, said driving motor being disposed in said car means.

9. A programmable sprinkler system according to claim 8 further including detaching/latching means for detaching and latching said carrier moving means from said car moving means.

10. A programmable sprinkler system according to claim 1 further including programmable control means said programmable control means being disposed in said car means.

11. A programmable sprinkler system according to claim 10 wherein said programmable control means is controlled by input switches and optical input signal voltages provided by reflective means disposed at preselected locations along said first and second rail means.

12. A programmable sprinkler system according to claim 4 wherein said means for controlling the rate of movement of said carrier means and said means for controlling the rate of movement of said car means is one and the same.

13. A programmable sprinkler system according to claim 1 further including means for permitting the disengaging of said detachable car means from said carrier means being responsive to an optically obtained signal voltage.

14. A programmable sprinkler system according to claim 1 wherein said programmable means includes computer means for automatically controlling the movements of said carrier means along said first rail means and said car means along said second rail means.

15. A programmable sprinkler system according to claim 14 further including optical means, said optical means having;

(a) reflector means disposed proximate said one end of said second rail and along said second rail means at preselected locations, (b) light source means disposed on said car means for cooperating with said reflector means as said light source means moves proximate thereto, and (c) detection means for detecting the light reflected from said reflector means and providing an electrical signal voltage responsive to said reflected light, said electrical signal voltage being coupled to said computer means for modifying prescribed functions of said car means.

16. A programmable sprinkler system according to claim 1 wherein said driving means comprises an electric motor.

17. A programmable sprinkler system according to claim 1, wherein said first and said second electrical coupling means comprises:

(a) a first water tight feed through connector disposed proximate said water valve coupling means, said connector having one end of said first feed through connector coupled to said source of electrical power providing continuous electrically conductive paths;

(b) a second water tight feed through connector disposed proximate the end of said water flow path, one end of said second feed through connector being coupled to said programmable means and the driving means of said water valve second coupling means, (c) insulated electrical conductor means disposed within said water flow path and connected between the other end of said first feed through connector and the other end of said second feed through connector, for providing continuous electrically conductive paths between said source of electrical power and said detachable car means.

* * * * *